US009327649B2

(12) United States Patent
Habibi

(10) Patent No.: US 9,327,649 B2
(45) Date of Patent: May 3, 2016

(54) REARVIEW MIRROR ASSEMBLY

(71) Applicant: MAGNA MIRRORS OF AMERICA, INC., Holland, MI (US)

(72) Inventor: Hamid Habibi, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 142 days.

(21) Appl. No.: 14/202,421

(22) Filed: Mar. 10, 2014

(65) Prior Publication Data

US 2014/0266666 A1  Sep. 18, 2014

Related U.S. Application Data

(60) Provisional application No. 61/793,572, filed on Mar. 15, 2013.

(51) Int. Cl.
*B60R 1/08* (2006.01)
*B60R 1/12* (2006.01)
*B60Q 1/26* (2006.01)

(52) U.S. Cl.
CPC ............ *B60R 1/1207* (2013.01); *B60Q 1/2665* (2013.01); *B60R 2001/1215* (2013.01); *B60R 2001/1223* (2013.01)

(58) Field of Classification Search
CPC .................................................... B60R 1/1207
USPC .............. 340/475; 359/265; 438/27; 362/494
See application file for complete search history.

(56) References Cited

U.S. PATENT DOCUMENTS 4,499,451 A * 2/1985 Suzuki et al. ................. 362/494
5,371,659 A   12/1994 Pastrick et al.
5,497,306 A   3/1996 Pastrick
5,669,699 A   9/1997 Pastrick et al.
5,669,704 A   9/1997 Pastrick
5,724,187 A   3/1998 Varaprasad et al.
5,786,772 A   7/1998 Schofield et al.
5,823,654 A   10/1998 Pastrick et al.
5,929,786 A   7/1999 Schofield et al.

(Continued)

FOREIGN PATENT DOCUMENTS

WO   WO2012/051500   4/2012
WO   WO2013/071070   5/2013
WO   WO2013/126719   8/2013

OTHER PUBLICATIONS http://www.nthdegreetech.com.

(Continued)

*Primary Examiner* — Brent Swarthout
(74) *Attorney, Agent, or Firm* — Gardner, Linn, Burkhart & Flory, LLP

(57) ABSTRACT

A rearview mirror assembly for a vehicle includes a mirror reflective element having at least one glass substrate and a mirror reflector established at a surface of said at least one glass substrate. The mirror assembly includes a display element disposed at the rear of the mirror reflective element and operable to emit light that is viewable through the mirror reflective element. The display element includes a printable light emitting diode. The mirror assembly may include at least one of (a) a printable electrically conductive layer at a surface of the at least one glass substrate, (b) a printable heater pad established at a rear surface of the at least one glass substrate, (c) a printable touch sensor and (d) a moldable light emitting diode element.

17 Claims, 4 Drawing Sheets

(56) References Cited

U.S. PATENT DOCUMENTS

| | | | |
|---|---|---|---|
| 6,176,602 B1 | 1/2001 | Pastrick et al. | |
| 6,198,409 B1 | 3/2001 | Schofield et al. | |
| 6,227,689 B1 | 5/2001 | Miller | |
| 6,276,821 B1 | 8/2001 | Pastrick et al. | |
| 6,582,109 B2 | 6/2003 | Miller | |
| 6,882,287 B2 | 4/2005 | Schofield | |
| 7,038,577 B2 | 5/2006 | Pawlicki et al. | |
| 7,255,451 B2 | 8/2007 | McCabe et al. | |
| 7,289,037 B2 | 10/2007 | Uken et al. | |
| 7,360,932 B2 | 4/2008 | Uken et al. | |
| 7,492,281 B2 | 2/2009 | Lynam et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,944,371 B2 | 5/2011 | Foote et al. | |
| 8,049,640 B2 | 11/2011 | Uken et al. | |
| 8,058,977 B2 | 11/2011 | Lynam | |
| 8,277,059 B2 | 10/2012 | McCabe et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 8,801,245 B2 | 8/2014 | De Wind et al. | |
| 2004/0240029 A1* | 12/2004 | Tonazzi et al. | 359/265 |
| 2008/0212189 A1* | 9/2008 | Baur et al. | 359/604 |
| 2009/0284164 A1 | 11/2009 | Ray et al. | |
| 2009/0284165 A1 | 11/2009 | Ray et al. | |
| 2009/0284179 A1 | 11/2009 | Ray et al. | |
| 2010/0065862 A1 | 3/2010 | Ray et al. | |
| 2010/0065863 A1 | 3/2010 | Ray et al. | |
| 2010/0068838 A1 | 3/2010 | Ray et al. | |
| 2010/0068839 A1 | 3/2010 | Ray et al. | |
| 2010/0167441 A1 | 7/2010 | Ray et al. | |
| 2010/0244056 A1 | 9/2010 | Ray et al. | |
| 2010/0252173 A1 | 10/2010 | Ray et al. | |
| 2010/0259719 A1* | 10/2010 | Sabeta | 351/161 |
| 2010/0308719 A1 | 12/2010 | Ray et al. | |
| 2010/0310760 A1 | 12/2010 | Ray et al. | |
| 2010/0317132 A1* | 12/2010 | Rogers et al. | 438/27 |
| 2011/0204020 A1 | 8/2011 | Ray et al. | |
| 2011/0205688 A1 | 8/2011 | Ray et al. | |
| 2012/0063136 A1 | 3/2012 | Ray et al. | |
| 2012/0074861 A1 | 3/2012 | Lowenthal et al. | |
| 2012/0161112 A1 | 6/2012 | Lowenthal et al. | |
| 2012/0161113 A1 | 6/2012 | Lowenthal et al. | |
| 2012/0161195 A1 | 6/2012 | Lowenthal et al. | |
| 2012/0161196 A1 | 6/2012 | Lowenthal et al. | |
| 2012/0161338 A1 | 6/2012 | Lowenthal et al. | |
| 2012/0164796 A1 | 6/2012 | Lowenthal et al. | |
| 2012/0164797 A1 | 6/2012 | Lowenthal et al. | |
| 2012/0169230 A1 | 7/2012 | Lowenthal et al. | |
| 2012/0178194 A1 | 7/2012 | Ray | |
| 2012/0178195 A1 | 7/2012 | Ray | |
| 2012/0217453 A1 | 8/2012 | Lowenthal et al. | |
| 2012/0248976 A1 | 10/2012 | Ray | |
| 2012/0252302 A1 | 10/2012 | Ray | |
| 2012/0321864 A1 | 12/2012 | Lowenthal et al. | |

OTHER PUBLICATIONS

Bullis, Kevin, Lighting Sheets Made of Tiny LEDS, http://www.technologyreview.com/news/425955/lighting-sheets-made-of-tiny-leds/, Oct. 28, 2011.

* cited by examiner

REARVIEW MIRROR ASSEMBLY

CROSS REFERENCE TO RELATED APPLICATION

The present application claims the filing benefits of U.S. provisional application Ser. No. 61/793,572, filed Mar. 15, 2013, which is hereby incorporated herein by reference in its entirety.

FIELD OF THE INVENTION

The present invention relates generally to the field of rearview mirror assemblies for vehicles.

BACKGROUND OF THE INVENTION

It is known to provide an automotive rearview mirror assembly that includes one or more accessories, such as a light source and/or a user input or the like. The mirror reflective element of such known mirror assemblies include a mirror reflector coating that is vacuum deposited or sputter coated onto a surface of a glass substrate of the mirror reflective element and the mirror assembly may include visual indicators such as turn signal indicators and blind zone indicators that indicate to a driver presence of another overtaking vehicle in a side lane adjacent to the equipped vehicle.

SUMMARY OF THE INVENTION

The present invention provides a rearview mirror assembly (such as an exterior mirror assembly mounted at a side of an equipped vehicle) that includes a mirror reflective element comprising at least one glass substrate and a mirror reflector established at a surface of the at least one glass substrate. The mirror assembly includes a display element disposed at a rear surface of the mirror reflective element and operable to emit light that is viewable through the mirror reflective element. The display element comprises a printable light emitting diode. The display element comprises a visual indicator that comprises at least one of (a) a printable electrically conductive layer at a surface of said at least one glass substrate, (b) a printable light emitting diode, (c) a printable heater pad established at a rear surface of said at least one glass substrate, (d) a printable touch sensor and (e) a moldable light emitting diode element.

These and other objects, advantages, purposes and features of the present invention will become apparent upon review of the following specification in conjunction with the drawings.

DESCRIPTION OF THE PREFERRED EMBODIMENTS

Figure 1:
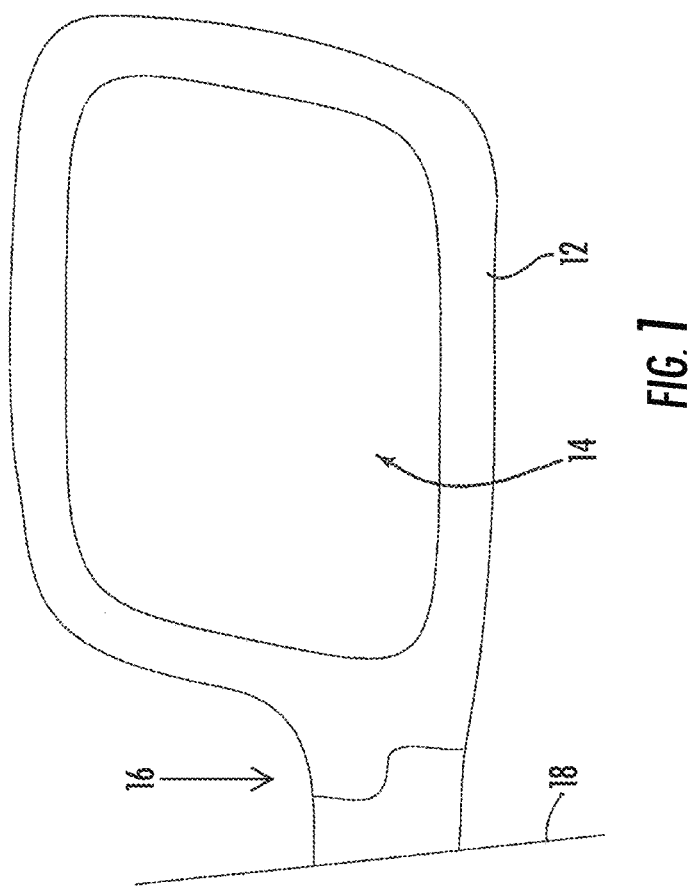
FIG. 1 is a perspective view of an exterior rearview mirror assembly in accordance with the present invention.

For the likes of an exterior rearview mirror assembly equipped with a turn signal indicator and/or a blind zone detection system indicator (such as described in U.S. Pat. Nos. 5,371,659; 5,497,306; 5,669,699; 5,669,704; 6,276,821; 7,944,371 and/or 8,058,977, which are hereby incorporated herein by reference in their entireties), directionality, spectral content and/or light intensity can be important. For an implementation of the present invention, concepts and constructions of U.S. Pat. Nos. 7,944,371 and/or 8,058,977, incorporated above, can benefit from use of the compositions and/or processes of the printable light emitting systems/elements of the present invention. For example, and such as by utilizing aspects of the indicators described in U.S. Pat. No. 7,944,371 (and such as shown in FIG. 16 of U.S. Pat. No. 7,944,371), the likes of a 3D printed element can be used to create both the back plate (that supports the mirror reflective element) utilizing a first polymeric material and use the printable LED materials to form or establish a printed integrated turn signal indicator and/or blind zone detection system indicator element or module for use in an exterior side view mirror assembly. Furthermore, for directionality, light directional films, such as available from the likes of 3M of St. Paul, Minn., and such as described in U.S. Pat. No. 8,058,977, can be utilized.

Of course, aspects of the present invention can be used in interior rearview mirror assemblies and for backlighting of a video mirror display and/or for dedicated indicia or icons or telltales. Optionally, the LED printing process of the present invention can be used to print or establish light emitting diodes at a cup or handle of a vehicular door handle for lighting, or can be used to establish a light emitting diode that backlights an icon or the like (such as by utilizing aspects of the door handles and exterior mirror assemblies described in U.S. patent application Ser. No. 13/674,458, filed Nov. 12, 2012, now U.S. Pat. No. 8,801,245, which is hereby incorporated herein by reference in its entirety). The resulting light unit (either at or in an exterior rearview mirror or interior rearview mirror or door handle or the like) may comprise a low profile lighting unit.

Referring now to the drawings and the illustrative embodiments depicted therein, an exterior rearview mirror assembly 10 for a vehicle includes a mirror casing 12 and a reflective element 14, with the mirror casing attaching to a mounting structure 16 at the side of the vehicle 18. Mirror assembly 10 is adjustably mounted to an exterior portion of a vehicle (such as to a side of the vehicle or door of the vehicle or the like) via the mounting structure or mounting configuration or assembly 16.

Figure 2:
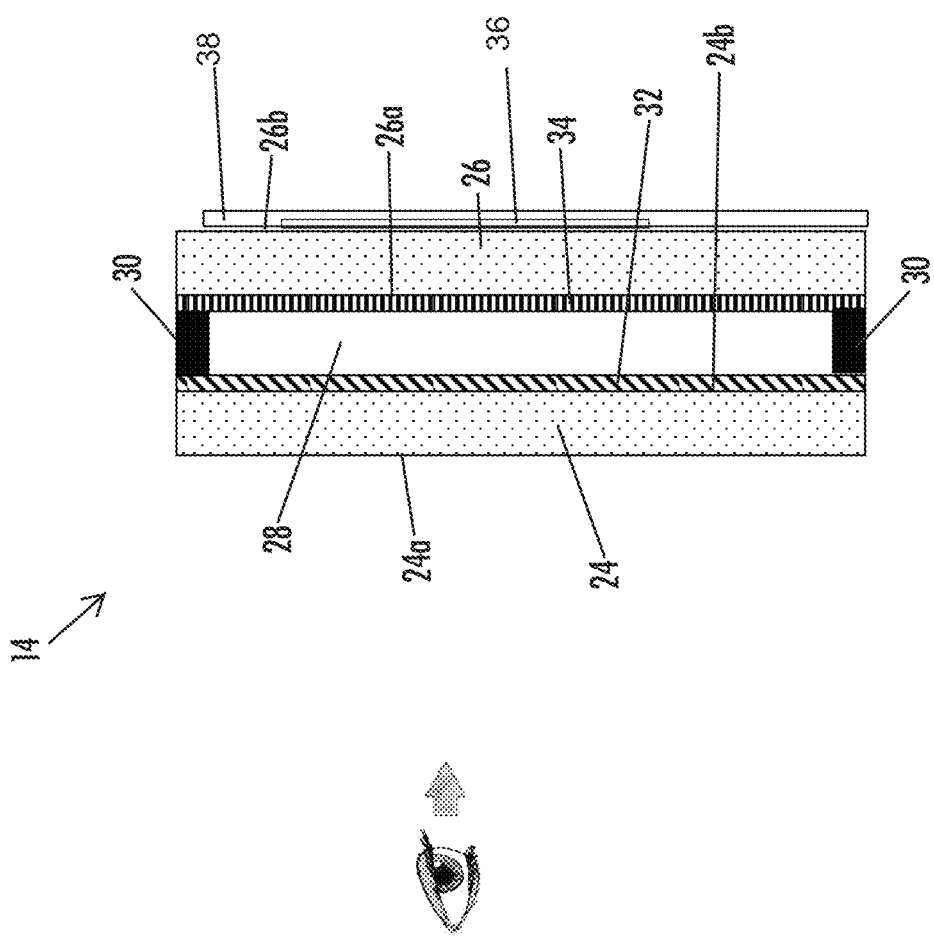
FIG. 2 is a cross sectional view of the rearview mirror assembly of FIG. 1.

As shown in FIG. 2, the mirror reflective element 14 may comprise an electro-optic (such as electrochromic) reflective element having includes a front substrate 24 having a front or first surface 24a (the surface that generally faces the driver of a vehicle when the mirror assembly is normally mounted at the vehicle) and a rear or second surface 24b opposite the front surface 24a, and a rear substrate 26 having a front or third surface 26a and a rear or fourth surface 26b opposite the front surface 26a, with an electro-optic medium 28 disposed between the second surface 24b and the third surface 26a and bounded by a perimeter seal 30 of the reflective element (such as is known in the electrochromic mirror art). The front substrate 24 has a transparent conductive coating or layer 32 disposed at its rear surface 24b, while the rear substrate 26 has a conductive coating or layer 34 disposed at its front surface 26a. The conductive coatings or layers may comprise a screen printable or ink-jet printable transparent conductive coating. Such a coating or layer can achieve conductivities as low as 8 ohms per square and very high transmission with a screen printable coating (no vacuum deposition). For example, a conductive polymer (such as of the types developed by Henkel, headquartered in Düsseldorf, Germany) may be printed and may use nano wires and is UV stable. The coating is provided on a polyester film so it can be printed on flexible substrates or rigid substrates (such as a glass substrate of a mirror reflective element). Optionally, the coating may not be used at the principal reflecting region of the mirror reflective element, but may be used for a touch screen portion of the reflective element. Such a touch screen may be made by screen printing only (again no vacuum deposition).

Figure 3:
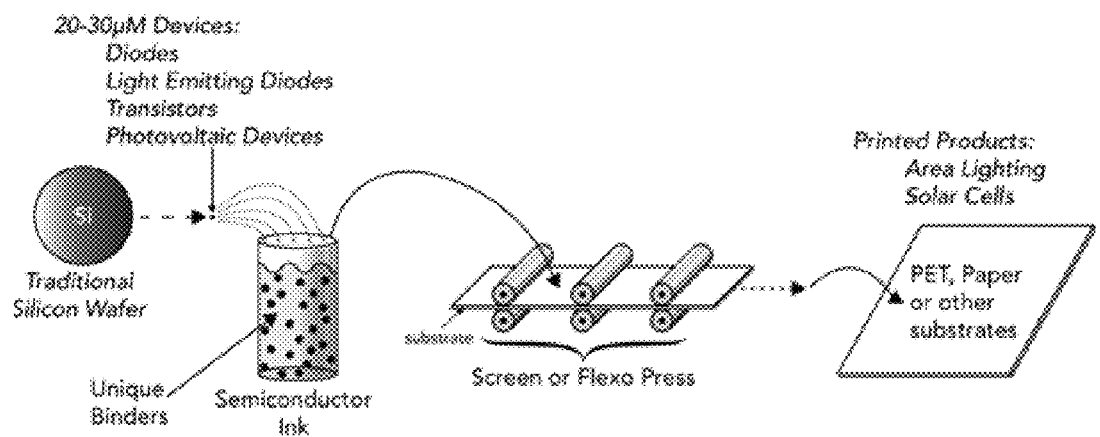
FIG. 3 is a schematic of a process suitable for use in making the printed elements of the present invention.
Figure 4:
FIG. 4 are views of exemplary printed light emitting diodes suitable for use in the rearview mirror assembly of the present invention.
Figure 4:
Figure 4:
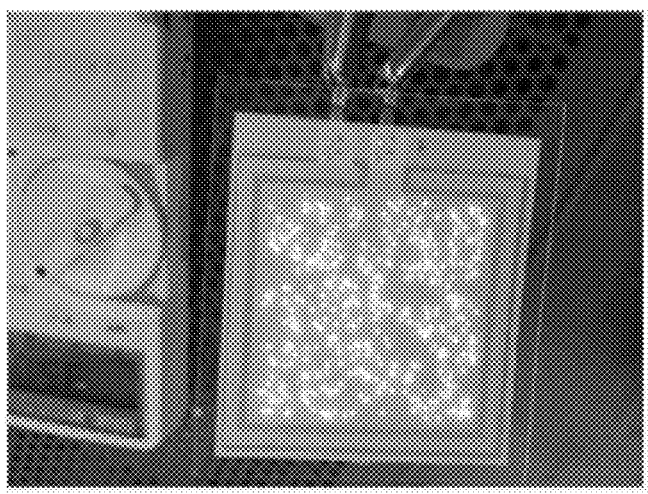

Optionally, and as shown in FIG. 2, the mirror assembly 10 may include a plurality of screen printable light emitting diodes (LEDs) 36 that uses a screen printable transparent coating. Such a screen printable LED may consist of a series of small LED dots (which may utilize aspects of the technology developed by Nth Degree Technologies of Tempe, Ariz.) that are screen printable onto the screen printable transparent conductive coating, which allows for the screen printing of the LEDs and such as described at http://www.nthdegreetech.com. For example, and such as shown in FIGS. 3 and 4, a silicon wafer (such as a wafer of gallium nitride) may be carved or ground or processed to produce millions of tiny LEDs (for example, one four-inch square water may yield about 8 million LEDs), which are then mixed with resin and binders, whereby a screen printer is used to deposit the resulting composition or "ink" over a surface. In addition to the LED ink, the surface may include a layer of silver ink for a back electrical contact, and a layer of phosphors to change the color of the light that is emitted by the LEDs (such as, for example, from a blue color to various shades of white), and an insulating layer may be provided to limit or prevent short circuits between the front and the rear of the substrate. The front electrical contact, which should be substantially transparent to allow for light to pass therethrough, may be made using an ink that contains very small metal wires or elements. See, for example, http://www.technologyreview.com/news/425955/lighting-sheets-made-of-tiny-leds/.

Because the lighting consists of small individual LED dots or elements or entities, the mirror assembly (which has the small LED dots or elements disposed at a substrate at the rear of the reflective element or at the rear surface of the rear substrate of the reflective element, whereby light emitted by the small LED elements passes through the mirror reflective element (such as through a transflective mirror reflector deposited or established on a surface of a substrate, such as a glass substrate or the like, of the mirror reflective element, or such as through an aperture or opening established in a mirror reflector deposited or established on a surface of a substrate, such as a glass substrate or the like, of the mirror reflective element) for viewing by a person viewing the mirror assembly when the mirror assembly is normally mounted at the vehicle) may include a diffuser or light diffusing element to achieve substantially uniform lighting. The LEDs may operate at greater than about 10 lumens/watt, more preferably at greater than about 30 lumens/watt and most preferably at greater than about 50 lumens/watt.

Some advantages of this technology include:
1. Thin. The coatings and LEDs may be only slightly thicker than the base polyester film.
2. Flexible.
3. Lower cost than known LEDs.
4. Operates on 6V DC as compared to EL which requires AC.
5. Possibly lower heat.
6. Can be printed on flexible substrates.
7. It is injection moldable. This means the flexible LED module can be put into an injection molding machine and integrated into other shapes.
8. Various colors are possible, such as, for example, a white LED which is blue on the back but with a yellow filter, so that it appears white from the front.
9. Animation. The LED dots can be individually actuated or energized to form moving images.

In the implementation of the present invention for automotive mirrors, specific semiconductor properties are transferred to glass substrate of an automotive mirror element using a printed process and inorganic semiconductor inks. These inks are made of microscopic functional devices (e.g. diodes, transistors, etc.), which are built using conventional wafer fabrication technology.

Optionally, it is envisioned that this technology may be used any place where lighting or backlighting or indicators or visual displays or icons are used in or on an automobile, such as in interior and/or exterior mirror assemblies of vehicles, and it also may offer unique capabilities for new lighting/display applications. The materials and methods of the present invention may be used in an exterior mirror "Display-on-Demand" (DoD) function, such as a backlight and/or as a display element/elements itself. When provided in a moldable form, the printable light emitting devices/elements may be integrated into any plastic form or component or element that forms part of the subject automotive assembly or sub-assembly (in the case of an exterior mirror assembly for example, such as the mirror housing shell or the like). Because the automotive lighting/indicators of the present invention can be formed to be thin (having a depth thickness of preferably less than about 6 mm, more preferably less than about 4 mm and more preferably less than about 2 mm), the lighting/indicators may be used in new ways, constructions and locations not previously feasible. Optionally, it may be used to generate DoD backlit HMI effects or display effects at touch sensors at the reflective element (such as described in International Publication No. WO 2013/071070, which is hereby incorporated herein by reference in its entirety). Optionally, the screen printed or ink jet printed or dispensed LEDs may be used as a skin on or component of various automotive modules (such as, for example, an outer skin or panel portion of door handles, dashboards, door panels, vanity mirrors and/or the like). Optionally, it may be used for logos or even moving images and/or the like.

Optionally, and as shown in FIG. 2, an exterior mirror element of an mirror assembly 10 may include a screen printed heater pad 38. For example, the heater pad can be printed on the back of the mirror reflective element (such as at the fourth or rear surface 24b of the rear substrate 24). Such coatings may be printed and then cured at around 120 degrees C. or lower, making this process compatible with already formed laminate type EC mirror elements, such as those described in U.S. Pat. No. 5,724,187, which is hereby incorporated herein by reference in its entirety. This would make it compatible with EC mirrors. Optionally, the mirror assembly 10 may include a screen printed touch sensor. For example, a silver ink, which is capable of very fine line printing and with the new transparent conductive coating, may be used to make screen printed touch modules.

Preferably additive manufacturing or 3D printing is used to form a three-dimensional solid object from a digital model. In such 3D printing of components for an automotive mirror assembly (for example, a turn signal indicator or a blind zone indicator), an additive process, where successive layers of the above described materials (along with others) are laid down in different shapes to form a 3D unit or part using digital printing technology.

In implementing this present invention for automotive mirrors, pattern printable transparent conductive Inks (such as available from Nth Degree Technologies of Tempe Ariz. and as described at http://www.nthdegreetech.com/printable-transparent-conductive-inks-info.php) may be used, Such printably-formed transparent conductive coatings or layers can economically meet or exceed the performance of likes of vacuum deposited ITO coatings. With 80-90 percent transmissivity and 5-10 ohms per square resistivity or better, the Nth TC Ink can be used in implementing this present invention for automotive mirrors.

In implementing this present invention for automotive mirrors, the compositions, techniques, methods and disclosures of the following may be used: U.S. Pat. Publication No. US-20120321864 "Metallic Nanofiber Ink, Substantially Transparent Conductor, and Fabrication Method"; U.S. Pat. Publication No. US-20120252302 "Method of Fabricating Static and Addressable Emissive Displays"; U.S. Pat. Publication No. US-20120248976 "Static and Addressable Emissive Displays"; U.S. Pat. Publication No. US-20120217453 "Metallic Nanofiber Ink, Substantially Transparent Conductor, and Fabrication Method"; U.S. Pat. Publication No. US-20120178195 "Method of Manufacturing a Light Emitting, Photovoltaic or Other Electronic Apparatus and System"; U.S. Pat. Publication No. US-20120178194 "Method of Manufacturing a Light Emitting, Photovoltaic or Other Electronic Apparatus and System"; U.S. Pat. Publication No. US-20120169230 "Illuminating Display Systems"; U.S. Pat. Publication No. US-20120164797 "Method of Manufacturing a Light Emitting, Power Generating or Other Electronic Apparatus"; U.S. Pat. Publication No. US-20120164796 "Method of Manufacturing a Printable Composition of a Liquid or Gel Suspension of Diodes"; U.S. Pat. Publication No. US-20120161338 "Printable Composition of a Liquid or Gel Suspension of Two-Terminal Integrated Circuits and Apparatus"; U.S. Pat. Publication No. US-20120161196 "Light Emitting, Power Generating or Other Electronic Apparatus"; U.S. Pat. Publication No. US-20120161195 "Printable Composition of a Liquid or Gel Suspension of Diodes"; U.S. Pat. Publication No. US-20120161113 "Diode for a Printable Composition"; U.S. Pat. Publication No. US-20120161112 "Diode for a Printable Composition"; U.S. Pat. Publication No. US-20120074861 "Apparatuses for Providing Power for Illumination of a Display Object"; U.S. Pat. Publication No. US-20120063136 "Addressable or Static Light Emitting or Electronic Apparatus"; U.S. Pat. Publication No. US-20110205688 "Multilayer Carbon Nanotube Capacitor"; U.S. Pat. Publication No. US-20110204020 "Method of and Printable Compositions for Manufacturing a Multilayer Carbon Nanotube Capacitor"; U.S. Pat. Publication No. US-20100310760 "Static and Addressable Emissive Displays"; U.S. Pat. Publication No. US-20100308719 "Static and Addressable Emissive Displays"; U.S. Pat. Publication No. US-20100252173 "Method of Manufacturing Addressable and Static Electronic Displays, Power Generating Or Other Electronic Apparatus"; U.S. Pat. Publication No. US-20100244056 "Addressable Or Static Light Emitting, Power Generating Or Other Electronic Apparatus"; U.S. Pat. Publication No. US-20100167441 "Method of Manufacturing a Light Emitting, Photovoltaic or Other Electronic Apparatus and System"; U.S. Pat. Publication No. US-20100068839 Method of Manufacturing a Light Emitting, Photovoltaic or Other Electronic Apparatus and System"; U.S. Pat. Publication No. US-20100068838 "Method of Manufacturing a Light Emitting, Photovoltaic or Other Electronic Apparatus and System"; U.S. Pat. Publication No. US-20100065863 "Light Emitting, Photovoltaic Or Other Electronic Apparatus and System"; U.S. Pat. Publication No. US-20100065862 "Light Emitting, Photovoltaic Or Other Electronic Apparatus and System"; U.S. Pat. Publication No. US-20090284179 "Apparatuses for Providing Power for Illumination of a Display Object"; and U.S. Pat. Publication No. US-20090284165 "Apparatuses for Illumination of a Display Object"; U.S. Pat. Publication No. US-20090284164 "Illuminating Display Systems", all of which are hereby incorporated by reference herein in their entireties.

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059; and/or 8,529,108, which are hereby incorporated herein by reference in their entireties, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761; and/or D647,017, and/or International Publication Nos. WO 2010/124064; WO 2011/044312; WO 2012/051500; WO 2013/071070; and/or WO 2013/126719, which are hereby incorporated herein by reference in their entireties (and with electrochromic and prismatic mirrors of such construction are commercially available from the assignee of this application under the trade name INFINITY™ mirror).

In the illustrated embodiment, the exterior rearview mirror assembly is designed and constructed as an electrochromic mirror assembly having a front glass substrate, with the front glass substrate of the electrochromic laminate element being constructed with its first surface/outermost perimeter edges slanted or beveled or rounded or the like, such as shown/described in U.S. Des. Pat. Nos. D633,423; D633,019; D638,761; and/or D647,017, and/or International Publication Nos. WO 2010/124064; WO 2011/044312; WO 2012/051500; WO 2013/071070; and/or WO 2013/126719, which are hereby incorporated herein by reference in their entireties, in order to obviate/avoid a sharp edge at the front or outermost perimeter surface of the mirror reflective element and mirror assembly that could potentially hurt/injure an occupant of a vehicle equipped with the rearview mirror assembly during an accident. The mirror casing may comprise any suitable mirror casing, and may comprise a plastic or polymeric molded casing or housing.

Although shown as an electrochromic mirror application, it is envisioned that the mirror assembly (such as an exterior rearview mirror assembly) may comprise a flat or bent glass substrate or the like. Also, although shown as an electrochromic mirror application, it is envisioned that the mirror assembly (such as an interior rearview mirror assembly) may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties.

Optionally, the rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

Optionally, the mirror assembly may include a blind spot indicator and/or a turn signal indicator, such as an indicator or indicators of the types described in U.S. Pat. Nos. 6,198,409; 5,929,786; and 5,786,772, and/or PCT Application No. PCT/US2006/026148, filed Jul. 5, 2006, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602; and/or 6,276,821, and/or International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; 5,786,772; and/or 7,720,580; and/or PCT Application No. PCT/US2006/026148, filed Jul. 5, 2006, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496; and/or 7,720,580, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 6,757,109; and/or 7,005,974, and/or of the automatic headlamp controls described in U.S. Pat. Nos. 5,796,094; 5,715,093; and/or 7,526,103, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, and/or International Publication No. WO 2004/047421, with all of the above referenced patents and publications being commonly assigned and being hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication No. WO 2013/071070, which are hereby incorporated herein by reference in their entireties, or such as proximity sensors of the types described in U.S. Pat. Nos. 7,224,324; 7,249,860; and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258; and 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322; and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052; and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 13/023,750, filed Feb. 9, 2011, now U.S. Pat. No. 8,890,955, Ser. No. 09/585,379, filed Jun. 1, 2000, now abandoned; and/or Ser. No. 10/207,291, filed Jul. 29, 2002, now abandoned, and/or U.S. Pat. Pub. Nos. US-2006-0061008; US-2006-0050018; US-2009-0015736; US-2009-0015736; and/or US-2010-0097469, and/or PCT Application No. PCT/US10/47256, filed Aug. 31, 2010, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; and/or 7,720,580, and/or U.S. Pat. Pub. Nos. US-2006-0171704; US-2009-0244361; and/or US-2010-0214791, and/or International Publication Nos. WO 2009/046268 and/or WO 2009/036176, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or European patent application, published Oct. 11, 2000 under Publication No. EP 0 1043566, and/or U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092; and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370, 983, and/or U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195, 381, which is hereby incorporated herein by reference in its entirety.

Optionally, it is envisioned that aspects of the present invention may be suitable for a rearview mirror assembly that comprises a prismatic mirror assembly or a non-electro-optic mirror assembly (such as a generally planar or optionally slightly curved mirror substrate) or an electro-optic or electrochromic mirror assembly. For example, the rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177; and/ or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227, 675; 6,229,319; and 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or 7,255,451, which are hereby incorporated herein by reference in their entireties). Optionally, other opaque or substantially opaque coatings or bands may be implemented while remaining within the spirit and scope of the present invention. Optionally, the printed light emitting diodes may be printed or established at or as part of the perimeter band and/or may provide highlighting or illumination at or along the perimeter band, or may comprise or provide one or more alerts or indicators at a portion of the perimeter band.

The mirror assembly may comprise or utilize aspects of other types of casings or the like, such as described in U.S. Pat. Nos. 7,338,177; 7,289,037; 7,249,860; 6,439,755; 4,826, 289; and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501; and/or 7,184,190, and/or in U.S. Pat. Pub. Nos. US-2006-0061008 and/or US-2006- 0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. Pat. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/ or 6,124,886, and/or U.S. Pat. Pub. No. US-2006-0050018, which are hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971, 552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813, 745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 7,657,052; 6,243,003; 6,278, 377; and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A rearview mirror assembly for a vehicle, said rearview mirror assembly comprising:
    a mirror reflective element comprising at least one glass substrate and a mirror reflector established at a surface of said at least one glass substrate;
    a display element disposed at the rear of said mirror reflective element and operable to emit light that is viewable through said mirror reflective element;
    wherein said display element comprises a printable light emitting diode;
    a mirror back plate disposed at the rear of said mirror reflective element; and
    wherein said mirror back plate comprises a three dimensional printed element and wherein said printable light emitting diode is established at said three dimensional printed element.

2. The rearview mirror assembly of claim 1, wherein said three dimensional printed element comprises a polymeric material and said printable light emitting diode comprises a pattern printable transparent conductive ink established at said three dimensional printed element.

3. The rearview mirror assembly of claim 2, wherein said rearview mirror assembly comprises an exterior rearview mirror assembly for mounting at an exterior side of a vehicle, and wherein said printable light emitting diode is established as one of (i) a printed integrated turn signal indicator and (ii) a printed integrated blind zone detection system indicator element.

4. The rearview mirror assembly of claim 1, wherein said rearview mirror assembly comprises an exterior rearview mirror assembly for mounting at an exterior side of a vehicle.

5. The rearview mirror assembly of claim 4, wherein said display element comprises a printable heater pad established at a rear surface of said at least one glass substrate.

6. The rearview mirror assembly of claim 1, wherein said display element comprises pattern printable transparent conductive ink established at a substrate.

7. The rearview mirror assembly of claim 1, wherein said display element comprises at least one of (i) a printable electrically conductive layer at a surface of said at least one glass substrate, (ii) a printable touch sensor and (iii) a moldable light emitting diode element.

8. The rearview mirror assembly of claim 1, wherein said mirror reflective element comprises a single glass substrate.

9. The rearview mirror assembly of claim 1, wherein said mirror reflective element comprises an electro-optic mirror reflective element and wherein said at least one glass substrate comprises front and rear substrates joined together with an electro-optic medium disposed between said front and rear substrates.

10. The rearview mirror assembly of claim 1, wherein said display element is operable to display information for at least one of (i) a compass system of the vehicle, (ii) a driver assistance system of the vehicle, (iii) a back up assist system of the vehicle and (iv) a video display operable to display video images of image data captured by at least one camera of the vehicle.

11. A rearview mirror assembly for a vehicle, said rearview mirror assembly comprising:
   a mirror reflective element comprising a glass substrate and a mirror reflector established at a surface of said glass substrate;
   a mirror back plate disposed at the rear of said mirror reflective element;
   a display element disposed at said mirror back plate and operable to emit light that is viewable through said mirror reflective element;
   wherein said display element comprises a printable light emitting diode that is printed at a surface of said mirror back plate;
   wherein said rearview mirror assembly comprises an exterior rearview mirror assembly for mounting at an exterior side of a vehicle; and
   wherein said mirror back plate comprises a three dimensional printed element comprising a polymeric material and wherein said printable light emitting diode comprises a pattern printable transparent conductive ink.

12. The rearview mirror assembly of claim 11, wherein said printable light emitting diode is established as one of (i) a printed integrated turn signal indicator and (ii) a printed integrated blind zone detection system indicator element.

13. The rearview mirror assembly of claim 12, wherein a printable heater pad is established at a rear surface of said at least one glass substrate.

14. The rearview mirror assembly of claim 11, wherein said display element is operable to provide at least one of (i) a turn signal indicator and (ii) a blind zone alert.

15. A rearview mirror assembly for a vehicle, said rearview mirror assembly comprising:
   a mirror reflective element comprising a glass substrate and a mirror reflector established at a surface of said glass substrate;
   a mirror back plate disposed at the rear of said mirror reflective element;
   a display element disposed at said mirror back plate and operable to emit light that is viewable through said mirror reflective element;
   wherein said display element comprises a printable light emitting diode that is printed at one of (i) a surface of said mirror back plate and (ii) a rear surface of said glass substrate;
   wherein said mirror back plate comprises a three dimensional printed element, and wherein said three dimensional printed element comprises a polymeric material, and wherein said printable light emitting diode comprises a pattern printable transparent conductive ink established at said three dimensional printed element.

16. The rearview mirror assembly of claim 15, wherein said display element comprises at least one of (i) a printable electrically conductive layer at said rear surface of said at least one glass substrate, (ii) a printable touch sensor and (iii) a moldable light emitting diode element.

17. The rearview mirror assembly of claim 15, wherein said display element is operable to display information for at least one of (i) a compass system of the vehicle, (ii) a driver assistance system of the vehicle, (iii) a back up assist system of the vehicle and (iv) a video display operable to display video images of image data captured by at least one camera of the vehicle.

* * * * *